Aug. 3, 1965     C. L. MOORE     3,198,124
INERTIA MACHINE
Original Filed April 26, 1961

INVENTOR.
CECIL L. MOORE
BY
Lockwood, Woodard, Smith & Weikart
Attorneys

United States Patent Office 3,198,124
Patented Aug. 3, 1965

3,198,124
INERTIA MACHINE
Cecil L. Moore, St. Louis, Mo., assignor, by mesne assignments, to E & R Laboratory Service Corporation, St. Louis, Mo., a corporation of Missouri
Original application Apr. 26, 1961, Ser. No. 105,712. Divided and this application Dec. 5, 1963, Ser. No. 334,073
7 Claims. (Cl. 103—71)

The application is a division of application Serial No. 105,712, now abandoned.

This invention relates generally to machines for receiving energy in random form from an external source and concentrating it in useful form to do work, and more particularly to a machine wherein the base thereof is moved by forces external thereto and the motions thereby imparted to the base move an inertial mass whose resistance to movement is caused to perform useful work.

Over the years, men have found various ways of harnessing energy manifested in various forms in nature. One of the earliest means of so doing was the employment of windmills, whereby the winds could be used to pump water and to generate electricity. Another means of harnessing energy from nature involves the use of dams and electrical generators whereby the energy in falling water is utilized to produce electricity. Another method of utilizing energy readily available in nature is the concentration of the rays of the sun by means of reflectors and the like to produce localized high temperatures. Still another, is exemplified in solar batteries.

The present invention is adapted to the harnessing of energy from waves in fluid and especially water. Accordingly, it has found practical application in boats where it is particularly useful as a bilge pump.

Heretofore, boats have required electrically or engine driven pumps in order to move water from the bilge overboard, with the attendant requirement of electricity, fuel oil, or some other relatively expensive source of energy. In addition, the pump and its drive means required either automatic or manual control. In the former instance the complications of switches and sensing means are involved and in the latter instance it requires the constant attention or at least frequent attention of a human operator. In addition to these disadvantages of conventional means employed as bilge pumps, they usually require considerable maintenance. This is especially true where the pump is made of comparatively corrosive materials.

It is therefore a general object of this invention to harness energy occurring at random in nature to make the energy available for performing useful work.

It is a more specific object of this invention to provide means for harnessing energy in waves of fluid.

It is still a further object of this invention to provide a machine driven by motions of a boat in water.

It is a further object of this invention to provide a pump driven by motions of the boat in the water.

It is a further object of this invention to provide a pump of the foregoing nature requiring no attention, operable continuously, and requiring no external power.

It is a still further object of this invention to provide a pump of the foregoing character readily adapted to various sizes, weights and capacities and to the use of simple and inexpensive manufacturing methods and materials.

In a typical embodiment of this invention, an inertial mass is suspended above the base by means of a plurality of springs, pistons, and cylinders in a tripod arrangement. The mass is suspended thereby in order to provide three degrees of freedom. Appropriate hose connections and valving are provided in order to provide an inlet for water from the bilge of the boat and an overboard outlet for water pumped by the relative motion between the inertial mass and the base thereof caused by motions of the boat in water.

The full nature of this invention will be understood from the accompanying drawings and the following description and the claims.

Figure 1:
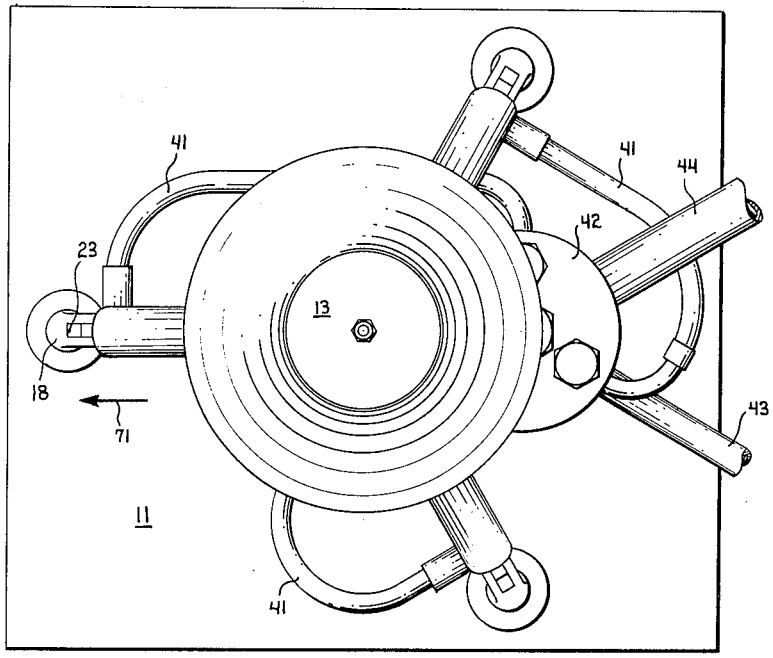
FIG. 1 is a plan view of a typical embodiment of this invention.
Figures 2, 3:
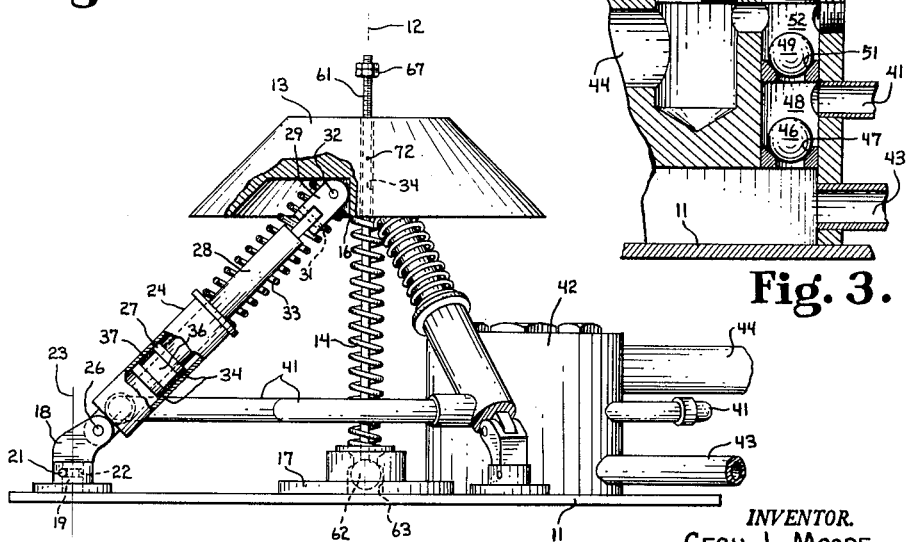
FIG. 2 is a side elevation of the embodiment of FIG. 1.
FIG. 3 is a section through the valve employed in the embodiment of FIGS. 1 and 2, the section being taken along lines 3—3 in FIG. 1.

Referring to FIGS. 1 and 2 the pump includes a base member 11. While this member is illustrated as a flat plate, it should be understood that throughout this specification, where the term base is used, it should not be considered limited to a plate as shown but rather used generically and intended to include any combination of supporting means to which the pump is mounted. The pump is arranged somewhat symmetrically about the axis 12 and includes a generally frusto-conical inertial mass 13. Mass 13 is supported by a coil spring 14 bearing on the underside 16 of the mass and on a base block 17 mounted to the base 11. A plurality of combinations of cylinders, pistons and springs is shown disposed around the axis 12 and coupled in tripod arrangement between the inertial mass and the base.

A swivel 18 is mounted to the post 19 affixed to the base 11, the pin 21 in the groove 22 of the post 19 providing a pivotal mounting about the axis 23. Cylinder 24 is pivotally mounted by means of the pin 26 to the swivel 18. A piston 27 is received in the cylinder 24 and has a piston rod 28 extending upwardly therefrom and coupled to the inertial mass by means of the universal joint 29. The piston rod is connected to the joint by means of the pin 31 and the joint is connected to the inertia mass by means of the pin 32. A coil spring 33 is disposed around the piston rod and between the cylinder and the inertia mass.

The piston has radially extending flange portions 34 adjacent each end thereof and in the annular groove 36 between the flange portions is disposed a wax seal 37. The wax seal has at least a portion which is continuous around the piston and the wax provides not only a sealing means but also lubrication for the piston operating in the cylinder. The diameter of the wax seal is slightly greater than that of the flange portions so that the seal and not the flange portions is the bearing member against the cylinder inside wall. The wax employed is of a comparatively high melting temperature type to avoid running out when the pump sets in the hot sun or some other hot environmental condition. Beeswax is a typical suitable wax.

A tube 41 connects each of the chambers between the piston and the closed end of the cylinder to a valve body 42. An inlet pipe 43 which may be from a sump or the bilge of the boat is also connected to the valve body 42 as well as an outlet pipe 44 which may conduct water to a suitable disposal place such as overboard.

FIG. 3 which is a section taken along the lines 3—3 in FIG. 2 illustrates a typical relationship between the inlets and outlets and the tubes 41 communicating with the cylinders of this invention. As shown in FIG. 3, a ball check valve 46 on the conical seat 47 prevents flow of liquid from the chamber 48 backward into the inlet conduit 43. Similarly, the ball check valve 49 is provided on the seat 51 to prevent flow of liquid from the chamber 52 back toward the chamber 48.

Referring again to FIG. 1, a rod 61 having a ball 62 at its lower end received in the socket 63 in the base block 17 passes through the aperture 64 in the mass 13 and has threads adjacent its upper end for the attachment or mounting thereto of the jam nuts 67. The rod is provided so that the pump may be inverted for shipping and the nuts advanced toward the inertia mass so that it will be carried by the rod and not by the spring or the pistons during transit in an upside down condition during shipment.

In the operation of the illustrated embodiment of the invention, the pump is generally mounted with one of the cylinders disposed in alignment with the longitudinal axis of the ship and toward the front and the other two cylinders are disposed laterally outwardly and to the rear. In other words, the pump is installed in the boat with the orientation of the boat being indicated by arrow 71 in FIG. 1. Pitching, yawing and rolling motions of the boat will transmit corresponding motions to the base of the pump. The inertia mass, however, will resist change of its position. Consequently, as these motions occur in the base of the pump, the pistons will be actuated in the cylinders. As a piston is moved in the upward or withdrawal direction with respect to the cylinder, it will draw fluid from the inlet 43 through a ball check valve 44 and into the conduit 41. Then as the piston is forced toward the closed end of the cylinder in its return direction, the ball check valve 46 will be seated and the check valve 49 will be opened thus permitting movement of the fluid in the cylinder to the outlet conduit 44. On suction strokes of each of the pistons the check valve 46 associated therewith will be opened and check valve 49 will be closed. On pressure movements of a piston, the check valve 46 associated therewith will be seated and the valve 49 will be opened.

Accordingly the motions of the pistons caused by the resistance of the inertia mass to tilting or other motions of the base will cause an effective pumping of fluid from the inlet to the outlet of the valve and in the boat the application can be used to cause pumping of water from the bilge overboard.

The springs 33 are capable of providing a restoring and centering or balancing action tending to move the mass 13 directly over the ball socket 63. The lines of action of the springs therefore intersect or converge to an intersection at the point 72 in FIG. 2 which is preferably the center of mass of the inertia mass 13. The frusto-conical shape of the mass is the most convenient shape used though other shapes may be employed if desired. Instead of the coil springs shown, other types of resilient members may be used in their place. Moreover, it is not absolutely necessary that the springs be disposed around a piston rod or in similar relationship, so long as they are disposed in order to provide a restoring or centering force or bias on the mass 13. The centrally located spring 14 may be dispensed with if desired, but when included it aids the sensitivity of the pump. When eliminated, springs 33 provide the support as well as the centering and the positioning force. It is not essential that universal joints or swivels of the type shown in the figures be employed, but ball sockets or other types of junctions or couplings may be employed. Moreover, it is not necessary that pistons and cylinders be used. Other means may be used such as diaphragms and bellows, for example.

All components are made of a non-corrosive material, and plastic is a good example of such material. The pump is readily adapted to various capacities by appropriate sizing of the mass and piston and cylinder means. The number of pistons and cylinders employed may be varied as well as their particular location. If desired, though it is not a preferred embodiment of the invention, a single piston could be employed in the location of the spring 14 of FIG. 2 and the pistons disposed around in tripod arrangement could be dispensed with. However, in this instance balancing springs would nevertheless be employed in a tripod arrangement.

The valve body and the arrangement of the tubing connecting the cylinders to the valve is only illustrative, as many other variations could be employed. For example, the valves could be mounted in the cylinders themselves. The embodiment shown lends iteself to simple manufacturing methods and many parts may be molded or cast in one piece.

In addition to the obvious advantages of this invention, it should be pointed out that it is able to use motions of the boat or ship in any direction and at any frequency. It is insensitive to varying frequencies and works constantly because of the slight forces required. It requires no attention and saves power and is extremely rugged and durable. It can be readily modified to meet wide varieties of demands.

While the invention has been disclosed and described in some detail in the drawings and foregoing descripton, they are to be considered as illustrative and not restrictive in character, as other modifications may readily suggest themselves to persons skilled in this art and within the broad scope of the invention, reference being had to the appended claims.

I claim:

1. An inertia machine mounted to a movable base for performing useful work in response to motions of the base to which it is mounted and comprising: an inertial mass; resilient means coupled to the base and supporting said inertial mass and normally positioning said mass at a certain point with respect to said base, the resilient means providing freedom of movement of said mass and said mass being movable rectilinearly and curvilinearly in every direction from said point; means coupled between said mass and said base and having a chamber therein of variable capacity whereby motions of the base change the positional relationship between the base and said inertial mass to cause variations in capacity of the chamber; a fluid in said chamber; and valve means coupled to said chambered means whereby said machine is adapted to pump said fluid, said chambered means being responsive to movements of said mass in every direction from said point to pump said fluid upon each movement of said mass from said point.

2. An inertia machine mounted to a movable base for performing useful work in response to motions of the base to which it is mounted and comprising: an inertial mass; resilient means coupled to the base and supporting said inertial mass above said resilient means, the resilient means providing three degrees of freedom of movement of said mass; variable chamber means coupled between said mass and said base and having a chamber therein of variable capacity whereby motions of the base temporarily change the positional relationship between the base and said inertial mass to cause variations in capacity of the chamber; a fluid in said chamber; and valve means coupled to said chamber means whereby said machine is adapted to pump said fluid, said inertial mass being supported substantially entirely by said resilient means.

3. A motorless pump actuated by motion of its base and comprising: a base; a plurality of variable chamber devices pivotally mounted to said base at spaced points about a point; resilient means carried by said devices; an inertial mass carried by said resilient means and positioned in spaced relation to a plane including three of said points, said inertial mass being coupled to said devices for varying chambers thereof when the base is moved.

4. A pump for a boat or the like and comprising: a base; an inertial mass; a plurality of means including springs coupled between said base and said inertial mass for positioning said mass in spaced relation to the base, the couplings of the springs to the inertial mass being disposed generally at closer distances with respect to each other than the couplings of the springs to the base are disposed with respect to each other, to provide lines of action of said positioning means converging in said mass for a mass centering bias; a plurality of variable chamber means coupled to said mass and said base for varying the capacity of the chambers thereof upon relative motion between the mass and the base; passageways for carrying fluid, said passageways being in communication with said variable chamber means, with a fluid inlet, and with a discharge outlet; valve means in said passageways whereby motions of the boat and resistance of the inertial mass to change of motion varies the capacity of said variable chamber means to pump fluid from the inlet to the discharge outlet.

5. A pump for a boat or the like and comprising: a base; an inertial mass; means coupled to said base and said inertial mass and including a resilient unit, for positioning said inertial mass in spaced relation to the base; pumping means coupled to said base and said inertial mass and including a cylinder, and a piston in said cylinder to provide a variable chamber therein; means pivotally fastening said piston and cylinder in combination to the inertial mass and said base; passageways for carrying fluid, said passageways communicating with said cylinder, with a fluid bearing sump, and with a discharge outlet; and valve means coupled to said passageways whereby motions of the boat and the resistance of the inertial mass to change of motion moves said piston with respect to said cylinder to pump fluid from the sump to the discharge outlet.

6. A pump for a boat or the like and comprising: a base; an inertial mass; a spring supporting said inertial mass above the base; a plurality of means laterally positioning and balancing said inertia mass above the base, said means including a cylinder and a piston in said cylinder to provide a variable chamber therein; means pivotally fastening said piston and cylinder in combination to the inertial mass and said base, the means fastening to the base being disposed generally at greater distances from each other than distances between the means fastening to the inertial mass, and said positioning and balancing means including and a spring between said base and the inertial mass to provide a mass balancing and centering bias; passageways for carrying fluid, said passageways communicating with said cylinder, with a fluid containing sump, and with a discharge outlet; and valve means in said passageways whereby motions of the boat and the resistance of the inertial mass to change of motion, moves said piston with respect to said cylinder to pump fluid from the sump to the discharge outlet.

7. A pump for a boat or the like and comprising: a base; an inertial mass; a plurality of means coupled to said base and said inertial mass for positioning said inertial mass above the base, each of said means including a cylinder and a piston in said cylinder to provide a variable chamber therein; means pivotally fastening said positioning means to the inertial mass and said base, the means fastening to the base being disposed at a distance radially outwardly from a line through the center of the mass and normal to a plane including at least three of said means fastening to the base, said distance being greater than those of said means fastening to the inertial mass from said line, to provide lines of action of said positioning means converging in said mass, said positioning means including springs between said base and the inertial mass to produce forces along said lines of action to provide a mass centering bias; passageways for carrying fluid, said passageways communicating with said cylinder, with a fluid containing sump, and with a discharge outlet; and valve means coupled to said passageways whereby motions of the boat, and the resistance of the inertial mass to change of motion, moves said piston with respect to said cylinder to pump fluid from the sump to the discharge outlet.

References Cited by the Examiner

UNITED STATES PATENTS

| | | | |
|---|---|---|---|
| 1,282,506 | 10/18 | West | 230—34 |
| 1,438,773 | 12/22 | Marschalek | 103—159 X |
| 1,658,067 | 2/28 | Wheeler | 230—34 |
| 2,781,166 | 2/57 | Flood et al. | 230—175 |

LAURENCE V. EFNER, *Primary Examiner.*

ROBERT M. WALKER, *Examiner.*